(12) United States Patent
Kim et al.

(10) Patent No.: US 6,382,256 B2
(45) Date of Patent: May 7, 2002

(54) THREE-WAY FLOW CONTROL VALVE

(75) Inventors: Wan-Yong Kim, Kwangju; Gyeong-Don Kim, Seoul, both of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/805,154

(22) Filed: Mar. 14, 2001

(30) Foreign Application Priority Data

May 29, 2000 (KR) ........................................ 2000-29050
Aug. 29, 2000 (KR) ........................................ 2000-50444

(51) Int. Cl.⁷ ............................................ F16K 11/044
(52) U.S. Cl. ................... 137/870; 251/129.05
(58) Field of Search ................................ 137/867, 870; 251/129.05

(56) References Cited

U.S. PATENT DOCUMENTS

| | | | | |
|---|---|---|---|---|
| 4,506,701 A | * | 3/1985 | Masaki et al. | 137/596.17 |
| 5,263,513 A | * | 11/1993 | Roe | 137/627.5 |
| 6,026,860 A | * | 2/2000 | Teichmann | 137/870 |
| 6,158,713 A | * | 12/2000 | Ohya et al. | 251/65 |

FOREIGN PATENT DOCUMENTS

| | | |
|---|---|---|
| JP | 06-193986 | 7/1994 |
| JP | 08-240278 | 9/1996 |

* cited by examiner

*Primary Examiner*—John Fox
(74) *Attorney, Agent, or Firm*—Robert E. Bushnell, Esq.

(57) ABSTRACT

A three-way flow control valve for refrigeration cycles having two parallel heat exchangers is disclosed. This valve is designed to selectively feed refrigerant to both heat exchangers, or one of the two heat exchangers as desired. The three-way flow control valve of this invention consists of a hollow cylindrical casing opened at its first and second ends. A first valve housing is held in the first end of the casing, and is provided with a first refrigerant outlet and a first orifice formed in the first refrigerant outlet. A second valve housing is held in the second end of the casing, and is provided with a refrigerant inlet and a second refrigerant outlet, and a second orifice formed between the refrigerant inlet and the second refrigerant outlet. A first valve means is axially set within the first valve housing so as to be axially movable to control the opening ratio of the first orifice. A second valve means is axially set within the second valve housing so as to be axially movable to control the opening ratio of the second orifice. An actuation means is set between the first and second valve housings while allowing the two valve housings to communicate with each other, and actuates the first and second valve means.

11 Claims, 10 Drawing Sheets

THREE-WAY FLOW CONTROL VALVE

CLAIM OF PRIORITY

This application makes reference to, incorporates the same herein, and claims all benefits accruing under 35 U.S.C. §119 from applications for 3-WAY TYPE REFRIGERANT CONTROL VALVE FOR REFRIGERATING CYCLE earlier filed in the Korean Industrial Property Office on the May 29, 2000 and there duly assigned Ser. No. 2000-29050, and for 3-WAY TYPE REFRIGERANT CONTROL VALVE FOR REFRIGERATING CYCLE earlier filed in the Korean Industrial Property Office on the Aug. 29, 2000 and there duly assigned Ser. No. 2000-50444.

BACKGROUND OF THE INVENTION

1. Field of the Invention

The present invention relates to three-way flow control valves for refrigeration cycles having two parallel heat exchangers and, more particularly, to a three-way flow control valve designed to selectively feed refrigerant to both heat exchangers or one of the two heat exchangers as desired.

2. Description of the Prior Art

As well known to those skilled in the art, a refrigeration cycle typically performs its refrigerating operation through a compression process, a condensation process, an expansion process, and an evaporation process. In a brief description, the refrigerating operation of the conventional refrigeration cycle is accomplished through repeated heat exchanging processes. Such refrigeration cycles have been preferably used in, for example, refrigerators and air conditioners.

In such refrigeration cycles, the compression process is performed by a compressor, the condensation process is performed by a condenser, the expansion process is performed by a capillary tube or an expansion valve, and the evaporation process is performed by an evaporator.

FIG. 1 shows a conventional refrigeration cycle, in which first and second evaporators 1A and 1B are arranged in parallel to each other to respectively cool the partitioned first and second refrigeration compartments R1 and R2 to desired temperatures. First and second capillary tubes 5a and 5B are mounted to the parallel refrigerant passage lines for the two evaporators 1A and 1B at positions before the two evaporators, respectively. First and second solenoid valves 4A and 4B are mounted to the parallel refrigerant passage lines at positions before the two capillary tubes 5A and 5B, respectively, so as to control the refrigerant flow for the two capillary tubes 5A and 5B. The above solenoid valves 4A and 4B are two-way flow control valves that are normally closed.

Provided on the main refrigerant passage line at positions before the two solenoid valves 4A and 4B are a compressor 2 and a condenser 3.

When it is desired to cool the partitioned first and second refrigeration compartments R1 and R2 to desired temperatures at the same time using the conventional refrigeration cycle, both the two solenoid valves 4A and 4B are opened. Therefore, the condensed refrigerant from the condenser 3 partially passes through both the first solenoid valve 4A and the first capillary tube 5A to reach the first evaporator 1A within the first refrigeration compartment R1. The refrigerant within the first evaporator 1A absorbs heat from air within the first refrigeration compartment R1, thus cooling the air to a desired temperature. On the other hand, the remaining part of the condensed refrigerant from the condenser 3 passes through both the second solenoid valve 4B and the second capillary tube 5B to reach the second evaporator 1B within the second refrigeration compartment R2. The refrigerant within the second evaporator 1B absorbs heat from air within the second refrigeration compartment R2, thus cooling the air to a desired temperature.

On the other hand, when it is desired to cool only the second refrigeration compartment R2 to a desired temperature, the second solenoid valve 4B is opened, with the first solenoid valve 4A kept at its closed position. In such an exclusive cooling mode for the second compartment R2, all the condensed refrigerant from the condenser 3 passes through both the second solenoid valve 4B and the second capillary tube 5B to reach the second evaporator 1B, and cools air within the second compartment R2 to the desired temperature. In the same manner, an exclusive cooling mode for the first refrigeration compartment R1 is accomplished by opening the first solenoid valve 4A and closing the second solenoid valve 4B.

However, such a conventional refrigeration cycle is problematic in that it is necessary to provide the two flow control valves for separately controlling the refrigerant flow for the two parallel evaporators, thus increasing the production cost of the refrigeration cycle in addition to increasing operational noise created from the drive unit for the two flow control valves.

SUMMARY OF THE INVENTION

Accordingly, the present invention has been made keeping in mind the above problems occurring in the prior art, and an object of the present invention is to provide a three-way flow control valve for refrigeration cycles having two parallel heat exchangers, which selectively feeds refrigerant to both heat exchangers or one of the two heat exchangers as desired.

In order to accomplish the above object, the present invention provides a three-way flow control valve, comprising a hollow cylindrical casing opened at its first and second ends, a first valve housing held in the first end of the casing and provided with a first refrigerant outlet and a first orifice formed in the first refrigerant outlet, a second valve housing held in the second end of the casing and provided with a refrigerant inlet and a second refrigerant outlet and a second orifice formed between the refrigerant inlet and the second refrigerant outlet, a first valve means axially set within the first valve housing so as to be axially movable to control the opening ratio of the first orifice, a second valve means axially set within the second valve housing so as to be axially movable to control the opening ratio of the second orifice, and an actuation means used for actuating the first and second valve means and set between the first and second valve housings while allowing the two valve housings to communicate with each other.

In the primary embodiment of this invention, first and second guide bores are provided within the first and second valve housings at the inlet ends of the first and second orifices. The first and second guide bores are threaded on their internal surfaces to form internal threads, and guide an opposite directional axial movement of the first and second valve means. Each of the first and second valve means comprises a spring holder set within an associated refrigerant outlet, a needle valve body movably set within each valve housing while axially penetrating an associated orifice, and an elastic biasing member set between the spring holder and the needle valve body to normally and elastically bias the needle valve body in a direction toward the actuation means.

The actuation means comprises a stator externally set around the sidewall of the casing, a rotor rotatably set within the casing with a gap left between the external surface of the rotor and the internal surface of the casing, a rotating shaft axially penetrating the rotor, a first actuator assembled with the upper end of the rotating shaft and axially moving the needle valve body of the first valve means in opposite directions in cooperation with the elastic biasing member of the first valve means and threaded on its external surface to form external threads movably engaging with the internal threads of the first guide bore, and a second actuator assembled with the lower end of the rotating shaft and axially moving the needle valve body of the second valve means in opposite directions in cooperation with the elastic biasing member of the second valve means and threaded on its external surface to form external threads movably engaging with the internal threads of the second guide bore.

In the three-way flow control valve, at least one communication hole is axially formed in each of the first and second actuators, thus allowing the two valve housings to communicate with each other through the communication holes of the two actuators.

In addition, two stoppers are provided at positions around opposite end surfaces of the rotor for limiting upper and lower dead points of the rotor.

Each of the two stoppers comprises a plurality of pin seat holes axially formed on the inside end surface of each valve housing, a stop pin set in one of the pin seat holes of each valve housing, a rotatable disc set on each end surface of the rotor, and a stop projection formed on the outside surface of the rotatable disc at the edge while extending toward the stop pin so as to be selectively caught by the stop pin.

In the three-way flow control valve according to the second embodiment, the first orifice of the first valve housing is formed at the inlet end of the first refrigerant outlet, and directly communicates with the interior of the casing. The first valve means comprises a first spring holder set within the first refrigerant outlet, a first needle valve body movably set within the first valve housing while axially penetrating the first orifice, and a first elastic biasing member set between the first spring holder and the first needle valve body to normally and elastically bias the first needle valve body in a direction toward the actuation means. A guide bore is provided within the second valve housing at the inlet end of the second orifice. This guide bore is threaded on its internal surface to form internal threads and guiding an opposite directional axial movement of the second valve means. The second valve means comprises a second spring holder set within the second refrigerant outlet, a second needle valve body movably set within the second valve housing while axially penetrating the second orifice, and a second elastic biasing member set between the second spring holder and the second needle valve body to normally and elastically bias the second needle valve body in a direction toward the actuation means.

In the second embodiment, the actuation means comprises a stator externally set around the sidewall of the casing, a rotor rotatably set within the casing with a gap left between the external surface of the rotor and the internal surface of the casing, a rotating shaft axially penetrating the rotor, a first actuator assembled with the upper end of the rotating shaft and axially moving the needle valve body of the first valve means in opposite directions in cooperation with the elastic biasing member of the first valve means, and a second actuator assembled with the lower end of the rotating shaft and axially moving the needle valve body of the second valve means in opposite directions in cooperation with the elastic biasing member of the second valve means and threaded on its external surface to form external threads movably engaging with the internal threads of the guide bore of the second valve housing.

The three-way flow control valve according to this second embodiment has two stoppers, which are provided at positions around opposite end surfaces of the rotor for limiting upper and lower dead points of the rotor.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
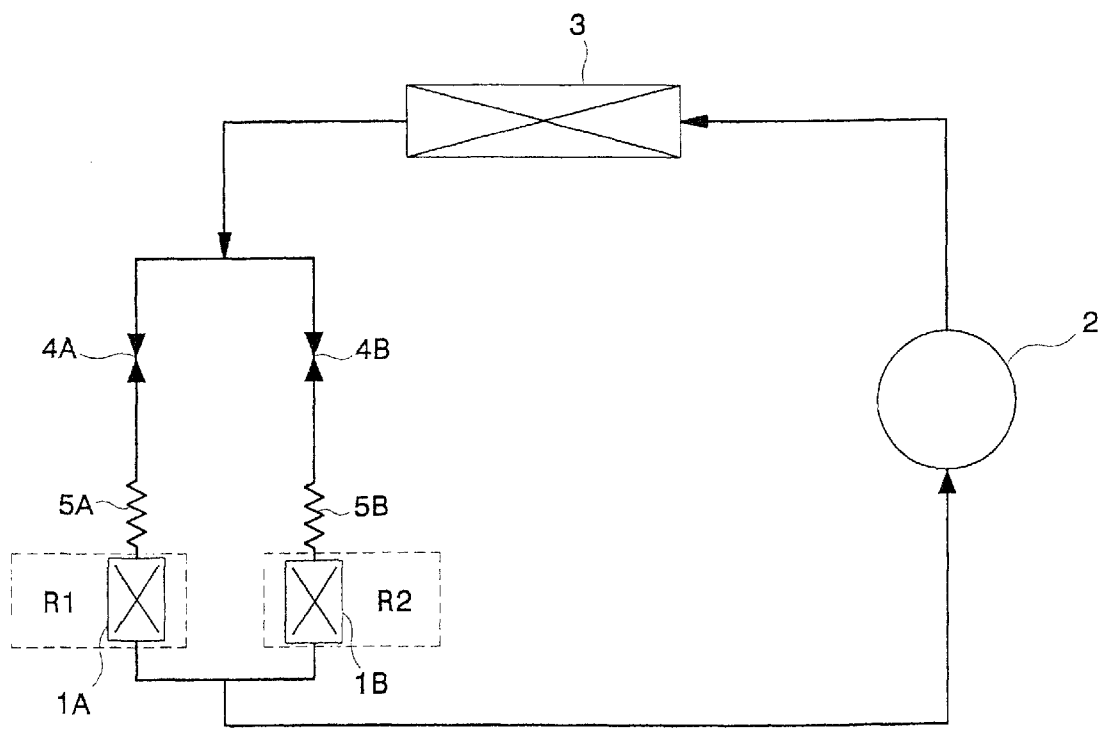
FIG. 1 is a circuit diagram of a conventional refrigeration cycle provided with a pair of two-way flow control valves.

Reference now should be made to the drawings, in which the same reference numerals are used throughout the different drawings to designate the same or similar components.

Figure 2:
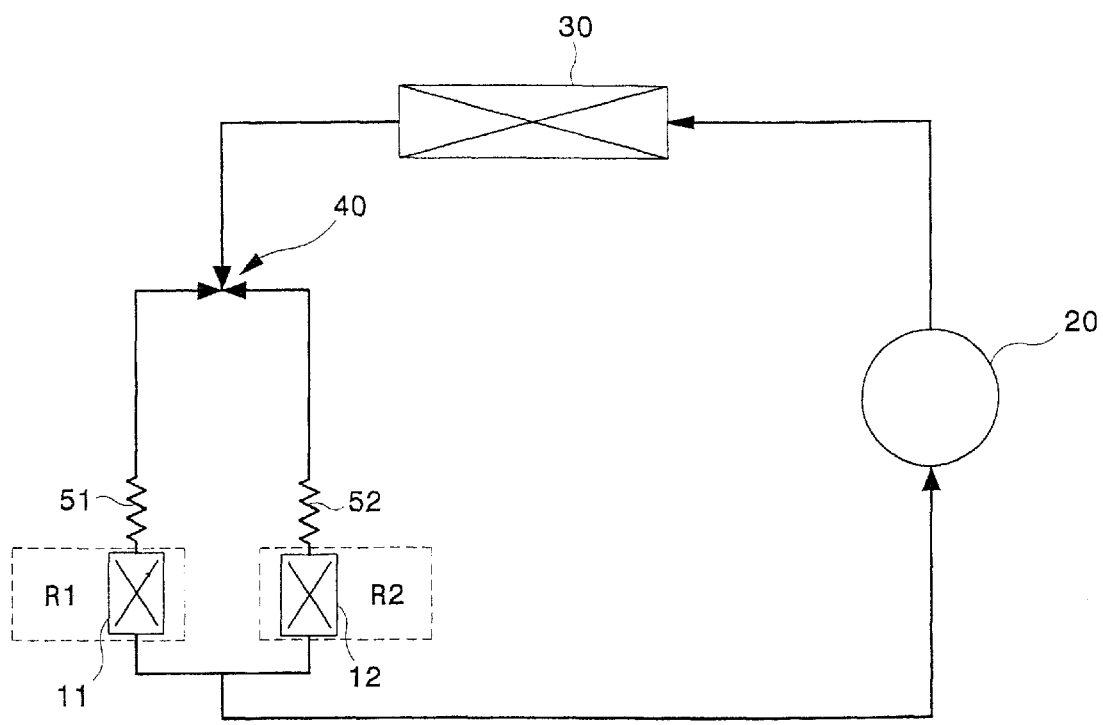
FIG. 2 is a circuit diagram of a refrigeration cycle provided with a three-way flow control valve in accordance with the present invention.

FIG. 2 is a circuit diagram of a refrigeration cycle provided with a three-way flow control valve in accordance with the present invention. As shown in the drawing, the refrigeration cycle having a three-way flow control valve of this invention comprises a compressor 20 used for compressing refrigerant to make highly pressurized hot refrigerant, and a condenser 30 used for condensing the refrigerant from the compressor 20. In the refrigeration cycle, first and second evaporators 11 and 12, used as heat exchangers of the cycle, are arranged in parallel to each other to respectively cool the partitioned first and second refrigeration compartments R1 and R2 to desired temperatures, with a first expansion means 51 and a second expansion means 52 respectively mounted to the parallel refrigerant passage lines for the two evaporators 11 and 12 at positions before the two evaporators. The three-way flow control valve 40 or 400 of this invention is mounted to the junction of the parallel refrigerant passage lines at a position before the two expansion means 51 and 52 so as to control the refrigerant flow for the two expansion means 51 and 52 such that the valve selectively feeds refrigerant to both evaporators 11 and 12 or one of the two evaporators as desired. The above-mentioned parts of the refrigeration cycle are coupled together into a closed circuit.

Figure 3:
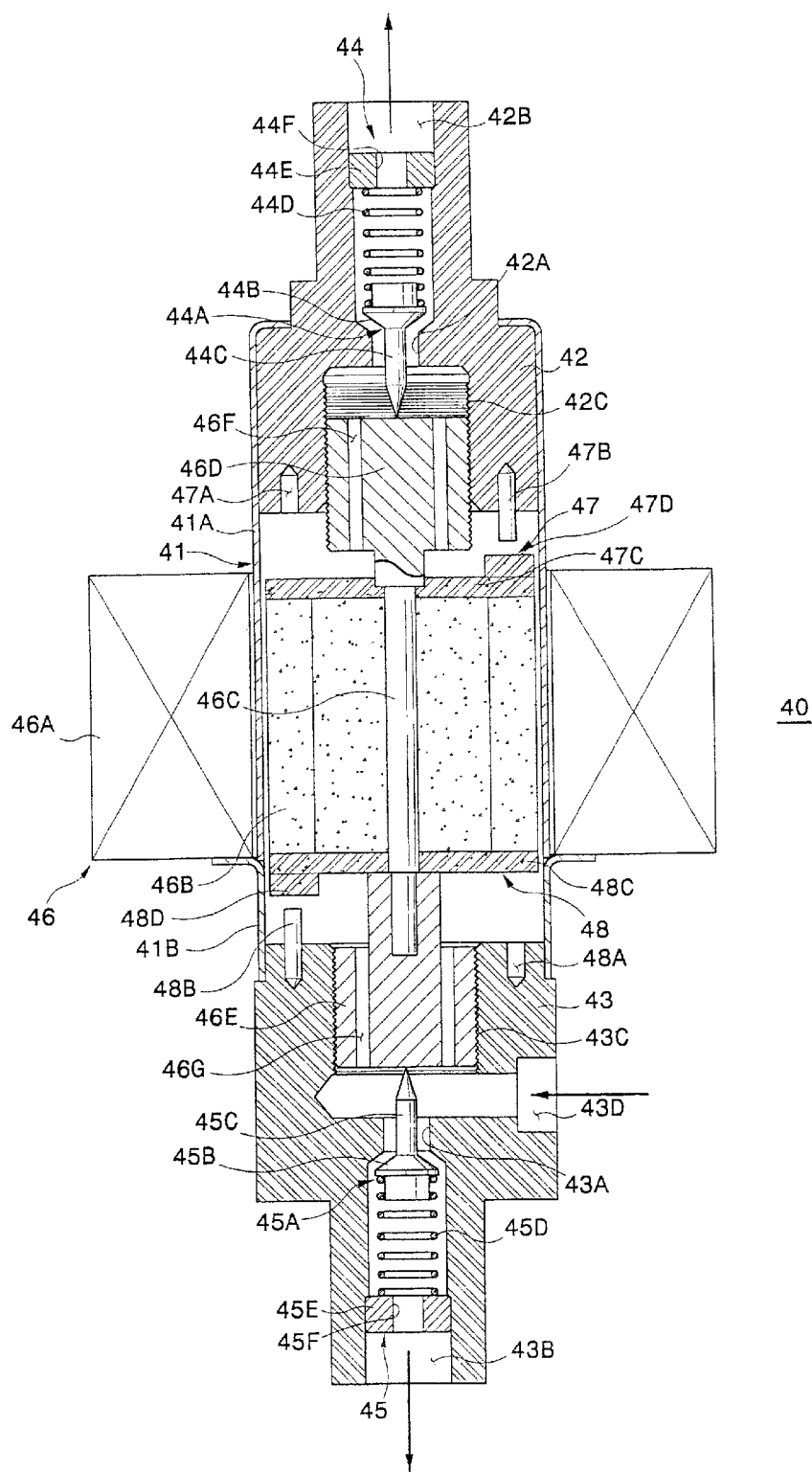
FIG. 3 is a sectional view of a three-way flow control valve in accordance with the primary embodiment of the present invention, showing both two outlets of the valve being opened.
Figure 4:
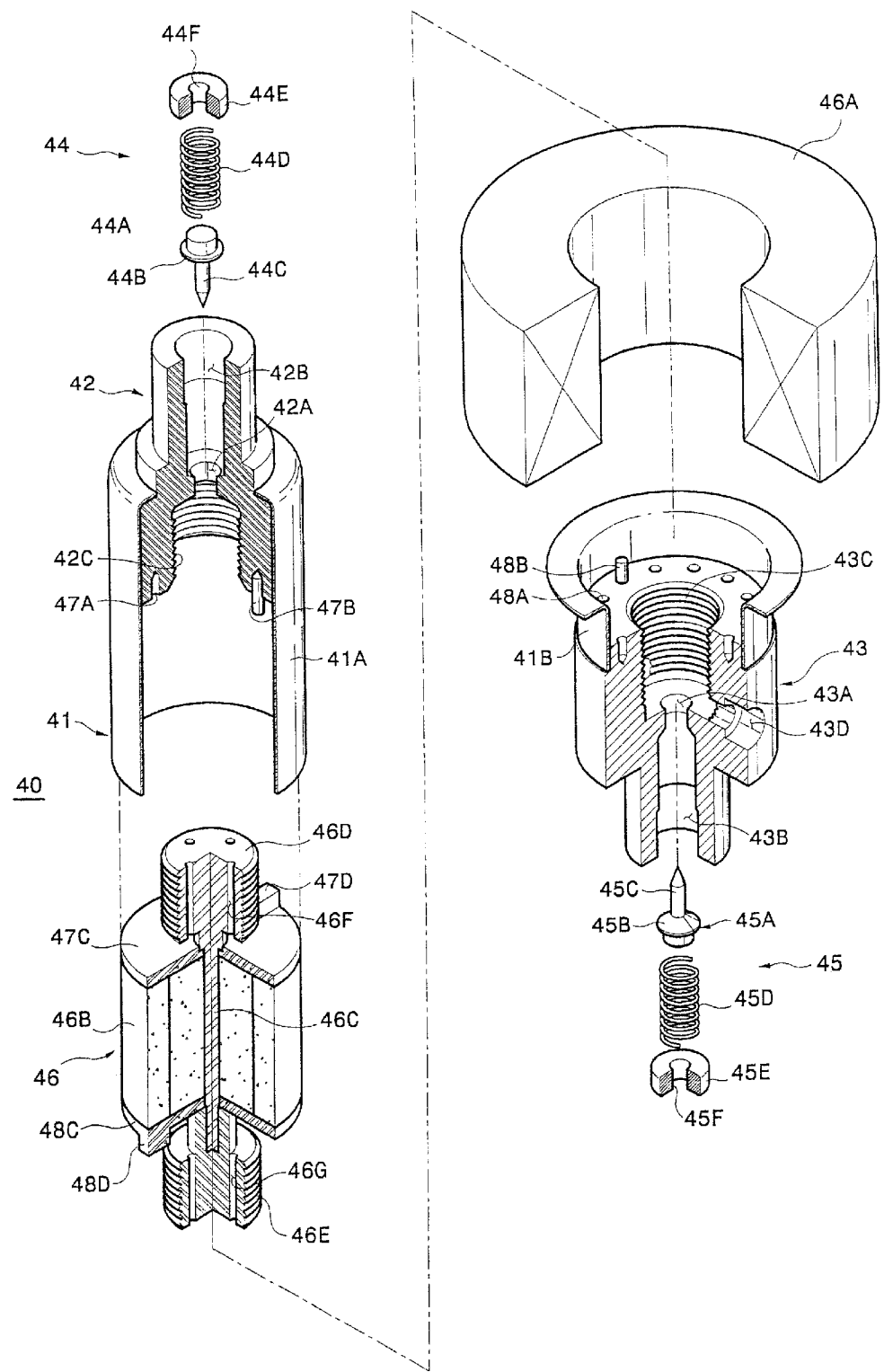
FIG. 4 is an exploded perspective view of the three-way flow control valve of FIG. 3, showing the construction of the important parts of the valve.

FIG. 3 is a sectional view of a three-way flow control valve in accordance with the primary embodiment of the present invention. FIG. 4 is an exploded perspective view of the three-way flow control valve of FIG. 3, showing the construction of the important parts of the valve.

As shown in the drawings, the three-way flow control valve 40 according to the primary embodiment of this invention comprises first and second valve housings 42 and 43 having first and second axial orifices 42A and 43A. A first valve means 44 and a second valve means 45 are respectively set within the two valve housings 42 and 43 so as to control the opening ratios of the axial orifices 42A and 43A of the two valve housings 42 and 43. An actuation means 46 is set between the two valve housings 42 and 43 so as to actuate the two valve means 44 and 45. Two stoppers 47 and 48 are arranged within the valve 40 at position around the opposite ends of the actuation means 46.

The first valve housing 42 has a first refrigerant outlet 42B and a first guide bore 42C, and is held by the first end of a hollow cylindrical casing 41. This first end of the cylindrical casing 41 is shown at the upper side of the drawings. The first refrigerant outlet 42B is formed at the outlet end of the first orifice 42A, and selectively discharges refrigerant from the first valve housing 42. The first guide bore 42C is formed at the inlet end of the first orifice 42A, and is threaded on its internal surface to form internal threads.

The second valve housing 43 has a second refrigerant outlet 43B and a second guide bore 43C. and is held by the second end of the cylindrical casing 41. This second end of the cylindrical casing 41 is shown at the lower side of the drawings. The second refrigerant outlet 43B is formed at the outlet end of the second orifice 43A, and selectively discharges refrigerant from the second valve housing 43. The second guide bore 43C is formed at the inlet end of the second orifice 43A, and is threaded on its internal surface to form internal threads. A refrigerant inlet 43D is formed in the second valve housing 43 at a position between the second refrigerant outlet 43B and the second guide bore 43C for introducing refrigerant into the valve 40.

The cylindrical casing 41 comprises upper and lower casing parts 41A and 41B. The first valve housing 42 is closely fitted into the upper casing part 41A, thus being held by the casing part 41A. The lower casing part 41B is flanged outward in a radial direction at its upper edge, thus forming an upper flange. This lower casing part 41B is assembled with the lower end of the upper casing part 41A, and is fitted over the second valve housing 43 at its lower end, thus holding the second valve housing 43.

As best seen in FIG. 2, the refrigerant outlets 42B and 43B of the two valve housings 42 and 43 are connected to the first and second evaporators 11 and 12, respectively. The refrigerant inlet 43D of the second valve housing 43 is connected to the condenser 30.

The first valve means 44 and the second valve means 45 are movably set within the two valve housings 42 and 43, respectively, such that they control the opening ratios of the axial orifices 42A and 43A of the two valve housings 42 and 43. The first valve means 44 comprises a needle valve body 44A, which is axially inserted into the orifice 42A from the refrigerant outlet 42B so as to be movably seated on a valve seat formed around the orifice 42A. An elastic biasing member 44D is set within the first valve housing 42 to normally and elastically bias the needle valve body 44A in a direction for closing the orifice 42A. A spring holder 44E is firmly set within the refrigerant outlet 42B to support the biasing member 44D. This spring holder 44E has a central hole 44F for allowing refrigerant to pass through the holder 44E to reach the refrigerant outlet 42B. In the same manner, the second valve means 45 comprises a needle valve body 45A, an elastic biasing member 45D, and a spring holder 45E having a central hole 45F.

In the first valve housing 42, the needle valve body 44A is axially movable within the refrigerant outlet 42B by both the actuation means 46 and the biasing member 44D. This needle valve body 44A consists of a conical valve head 44B seated on the valve seat around the orifice 42A. A leg 44C extends from the valve head 44B to a predetermined length such that the leg 44C passes through the orifice 42A to reach the guide bore 42C. In the same manner, the needle valve body 45A within the second valve housing 43 consists of a conical valve head 45B, and a leg 45C extending from the valve head 45B to a predetermined length such that the leg 45C passes through the orifice 43A to reach the guide bore 43C. This needle valve body 45A is axially movable within the refrigerant outlet 43B by both the actuation means 46 and the biasing member 45D. In such a case, the ends of the legs 44C and 45C of the two valve bodies 44A and 45A always come into contact with opposite ends of the actuation means 46 within the guide bores 42C and 43C. In order to reduce frictional resistance acting at the junction of the two legs 44C and 45C and the actuation means 46, the two legs 44C and 45C are sharpened at their ends.

In the three-way flow control valve 40 of this primary embodiment, the two needle valve bodies 44A and 45A are axially movable in opposite directions within the valve housings 42 and 43 by both the actuation means 46 and the biasing members 44D and 45D. That is, the biasing members 44D and 45D normally bias the two valve heads 44B and 45B toward the orifices 42A and 43A, while the actuation means 46 selectively biases at least one of the two valve heads 44B and 45B toward the refrigerant outlets 42B and 43B. It is thus possible to control the opening ratios of the orifices 42A and 43A by controlling the actuation means 46.

The actuation means 46 is a kind of reversible step motor, which is rotatable in opposite directions. This actuation means 46 comprises a stator 46A, which is externally set around the sidewall of the upper casing part 41A and is supported by the upper flange of the lower casing part 41B. The actuation means 46 also comprises a rotor 46B, which is set within the casing 41. This rotor 46B is axially movable in opposite directions toward the two valve housings 42 and 43 while being rotated in opposite directions at a position between the first and second valve housings 42 and 43.

The stator 46A is a cylindrical solenoid having coils, thus forming a desired electric field when it is electrically activated. This stator 46A is externally set around the sidewall of the casing 41 at a position between the two valve housings 42 and 43. The rotor 46B is a magnet, with a rotating shaft 46C axially penetrating the magnet 46B along the central axis of the valve 40. This rotor 46B is rotatable in opposite directions within the cavity between the first and second valve housings 42 and 43 in cooperation with the stator 46A so as to be axially movable in opposite directions toward the two valve housings 42 and 43. An annular gap is formed between the external surface of the rotor 46B and the internal surface of the casing 41, thus allowing the upper and lower parts of the cavity around the rotor 46B to communicate with each other.

First and second actuators 46D and 46E are assembled with opposite ends of the rotating shaft 46C, and are movably set within the guide bores 42C and 43C of the first and second valve housings 42 and 43, respectively. The outside ends of the two actuators 46D and 46E are always brought into contact with the sharpened ends of the legs 44C and 45C of the two needle valve bodies 44A and 45A, thus selectively biasing the valve bodies 44A and 45A toward the refrigerant outlets 42B and 43B as desired. The two actuators 46D and 46E are threaded on their external surfaces, thus forming external threads movably engaging with the internal threads of the guide bores 42C and 43C. The two actuators 46D and 46E thus move in opposite directions under the guide of the guide bores 42C and 43C in response to a rotation of the rotor 46B, and actuate the needle valve bodies 44A and 45A. A plurality of communication holes 46F or 46G are regularly and axially formed in each of the two actuators 46D and 46E from one end to the other, thus allowing the two valve housings 42 and 43 to communicate with each other through the holes 46F and 46G.

The two stoppers 47 and 48 are provided at positions between the two valve housings 42 and 43 and opposite end surfaces of the rotor 46B for limiting the opposite directional movement of the rotor 46B. Each of the two stoppers 47 and 48 comprises a stop pin 47B or 48B, which is axially set on the inside end of each valve housing 42 or 43. A rotatable disc 47C or 48C is fixedly set on each end surface of the rotor 46B such that the two discs 47C and 48C are rotatable along with the rotor 46B. A stop projection 47D or 48D is formed on the outside surface of each of the two discs 47C and 48C at a predetermined position. Each of the two stop projections 47D and 48D is caught by an associated one of the two stop pins 47B and 48B when the rotor 46B reaches an upper dead point or a lower dead point during an opposite directional axial movement, thus stopping the axial movement of the rotor 46B.

In order to seat the stop pins 47B and 48B on the valve housings 42 and 43, a plurality of pin seat holes 47A or 48A are formed on the inside end surface of each valve housing 42 or 43 at regular and angular intervals to form a circular arrangement of holes. In the primary embodiment, it is preferable to form twelve holes 47B or 48B on the inside end surface of each valve housing at regular and angular intervals of 30°, with the stop pin 47B or 48B fitted into one of the twelve holes 47B or 48B. Since each valve housing 42 or 43 has such a number of pin seat holes 47A or 48A, it is possible to somewhat freely adjust the axial moving distance of the rotor 46B, which is limited by the stop projections 47D and 48D caught by the stop pins 47B and 48B during axial movements of the rotor 46B. This finally allows the opening ratios of the orifices 42A and 43A to be more precisely controlled. That is, since the position of the stop pins 47B and 48B on the valve housings 42 and 43 is changeable as desired, it is possible to correct any errors of the upper and lower dead points of the rotor 46B due to dimensional errors created in the process of producing or assembling the parts of the valve 40.

Each of the stop projections 47D and 48D is cast with the outside edge of an associated disc 47C or 48C at a predetermined position into a single structure through a plastic injection molding process. The first stop projection 47D extends upward from the disc 47C fixed to the upper end surface of the rotor 46B. A predetermined gap is left between the stop projection 47D and the stop pin 47B when the rotor 46B is positioned at a neutral position between the upper and lower dead points to accomplish a neutral mode. In the same manner, the second stop projection 48D extends downward from the disc 48C fixed to the lower end surface of the rotor 46B, with a predetermined gap left between the stop projection 48D and the stop pin 48B when the rotor 46B is in neutral mode.

In the present invention, it is preferable to design the valve 40 such that the first stop projection 47D is caught by the stop pin 47B after the rotor 46B turns two times in a forward direction to accomplish a forward turning angle of 720°, thus stopping the upward axial movement of the rotor 46B. In the same manner, the second stop projection 48D is preferably designed to be caught by the stop pin 48B after the rotor 46B turns two times in a reverse direction to accomplish a reverse turning angle of 720°, thus stopping the downward axial movement of the rotor 46B.

The operational effect of the above-mentioned three-way flow control valve 40 will be described herein below.

During an operation of the refrigeration cycle of FIG. 2, the three-way flow control valve 40 is controlled by a controller (not shown) to selectively feed refrigerant from the condenser to both parallel evaporators 11 and 12 or any one of the two evaporators 11 and 12 as desired.

When it is desired to feed refrigerant from the condenser to both parallel evaporators 11 and 12, the valve 40 is operated as follows. That is, the stator 46A is electrically activated to primarily accomplish a neutral mode of the rotor 46B as shown in FIG. 3.

In the neutral mode of the rotor 46B, the first actuator 46D, always coming into contact with the sharpened end of the leg 44C of the needle valve body 44A of the first valve means 44, axially biases the valve body 44A toward the spring holder 44E while compressing the first biasing means 44D. Therefore, the valve head 44B of the needle valve body 44A is separated from the orifice 42A of the first valve housing 42, thus opening the orifice 42A. In the same manner, the second actuator 46E, always coming into contact with the sharpened end of the leg 45C of the needle valve body 45A of the first valve means 45, axially biases the valve body 45A toward the spring holder 45E while compressing the second biasing means 45D. Therefore, the valve head 45B of the needle valve body 45A is separated from the orifice 43A of the second valve housing 43, thus opening the orifice 43A. In a brief description, both orifices 42A and 43A are opened when the rotor 46B is in neutral mode.

In such a case, the refrigerant from the condenser 30 is introduced into the valve 40 through the refrigerant inlet 43D of the second valve housing 43, and is partially discharged from the valve 40 through the open orifice 43A and the refrigerant outlet 43B of the second valve housing 43 to be fed to the second evaporator 12. The remaining part of the refrigerant within second valve housing 43 of the valve 40 is introduced into the first valve housing 42 through the communication holes 46G of the second actuator 46E, the annular gap between the rotor 46B and the casing 41, and the communication holes 46F of the first actuator 46D. The refrigerant is, thereafter, discharged from the first valve housing 42 through the open orifice 42A and the refrigerant outlet 42B of the valve housing 42 to be fed to the first evaporator 11. Therefore, it is possible to cool the first and second refrigeration compartments R1 and R2 to desired temperatures at the same time using the parallel evaporators 11 and 12.

While the rotor 46B is in neutral mode, the two orifices 42A and 43A of the valve 40 are kept open even when the compressor 20 stops its refrigerant compressing operation. Therefore, the refrigerant circulation through the first and second orifices 42A and 43A of the valve 40 is continued until the existing pressure difference between the inlet and outlet of the compressor 20 is removed.

Figure 5:
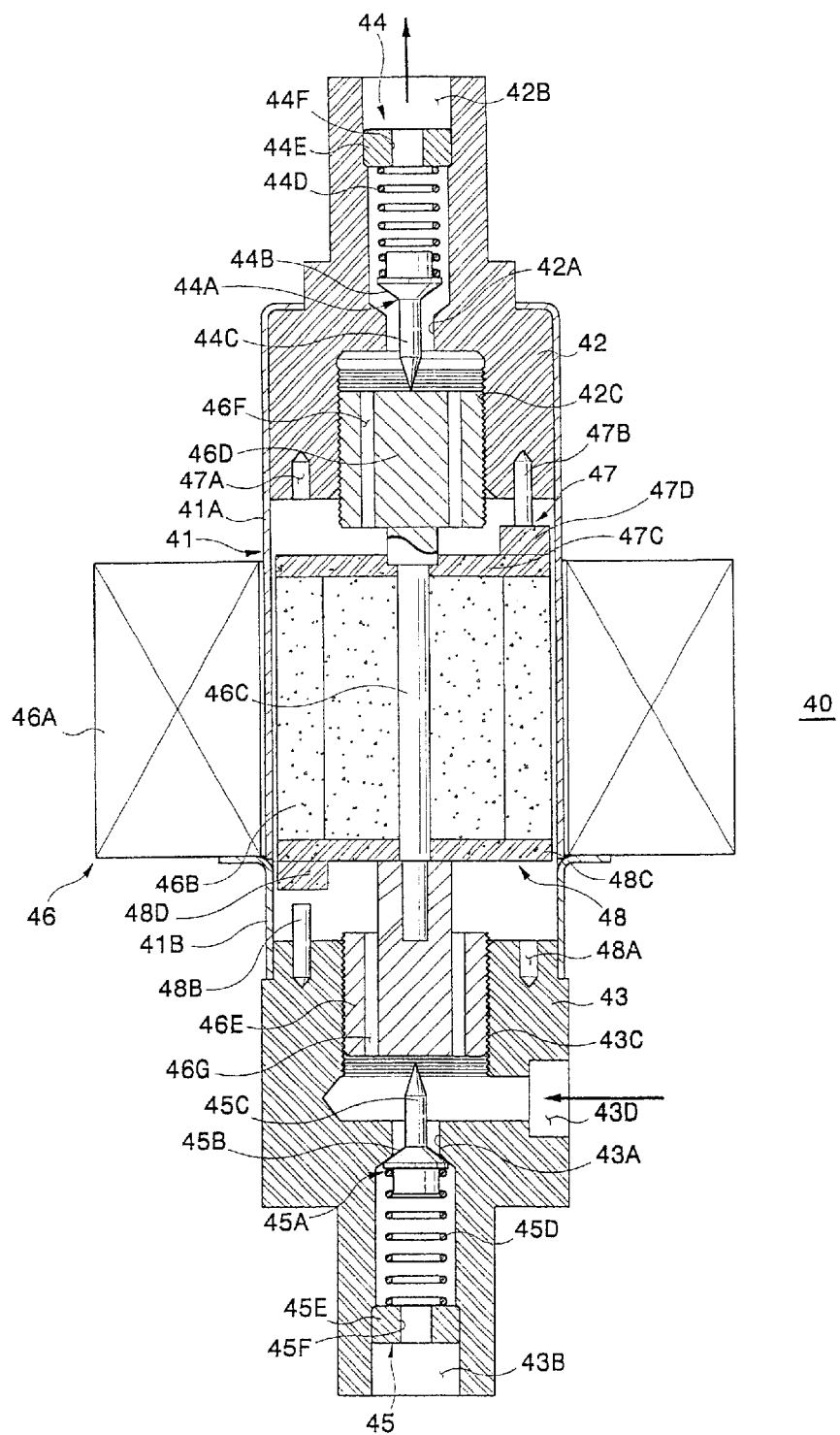
FIGS. 5 and 6 are sectional views of the three-way flow control valve of FIG. 3, showing one of the two outlets being opened and the other being closed.

When it is desired to feed refrigerant only to the first evaporator 11 and exclusively cool the first refrigeration compartment R1 to a desired temperature, the three-way flow control valve 40 of this invention is operated as follows. The operation of the valve 40 in such a case will be described with reference to FIGS. 2 and 5.

When it is desired to exclusively cool the first refrigeration compartment R1 to a desired temperature, the stator 46A is electrically activated to rotate the rotor 46B in a forward direction. In such a case, the first and second actuators 46D and 46E are rotated in the same direction along with the rotor 46B. The first and second actuators 46D and 46E, set within the guide bores 42C and 43C of the first and second valve housings 42 and 43 through a screw-type engagement, are thus axially moved upward within the bores 42C and 43C in the drawings while being rotated within said bores 42C and 43C. Therefore, the first actuator 46D biases the needle valve body 44A of the first valve means 44 toward the refrigerant outlet 42B while compressing the biasing member 44D, thus opening the orifice 42A of the first valve housing 42. On the other hand, the existing pressure applied from the second actuator 46E to the needle valve body 45A of the second valve means 45 is reduced to allow the valve body 45A to be biased toward the orifice 43A of the second valve housing 43 by the restoring force of the biasing member 45D. Therefore, the orifice 43A is closed by the valve head 45B of the needle valve body 45A.

Such a forward rotation of the rotor 46B is stopped at a time the stop projection 47D of the first disc 47C is caught by the stop pin 47B. The position of the rotor 46B within the valve 40 in such a case is the upper dead point of the rotor 46B. At the upper dead point of the rotor 46B, the valve head 44B of the needle valve body 44A of the first valve means 44 is completely separated from the first orifice 42A to maximize the opening ratio of said orifice 42A. On the other hand, the valve head 45B of the needle valve body 45A of the second valve means 45 completely closes the second orifice 43A.

In such a case, the refrigerant, introduced from the condenser 30 into the valve 40 through the refrigerant inlet 43D of the second valve housing 43, does not flow through the orifice 43A or the refrigerant outlet 43B of the second valve housing 43. However, all the refrigerant flows from the second valve housing 43 into the first valve housing 42 through the communication holes 46G of the second actuator 46E, the annular gap between the rotor 46B and the casing 41, and the communication holes 46F of the first actuator 46D. The refrigerant is, thereafter, discharged from the first valve housing 42 through the open orifice 42A and the refrigerant outlet 42B of said valve housing 42 to be fed to the first evaporator 11. Therefore, it is possible to feed the refrigerant only to the first one 11 of the two parallel evaporators 11 and 12 and exclusively cool the first refrigeration compartment R1 to a desired temperature.

Figure 6:
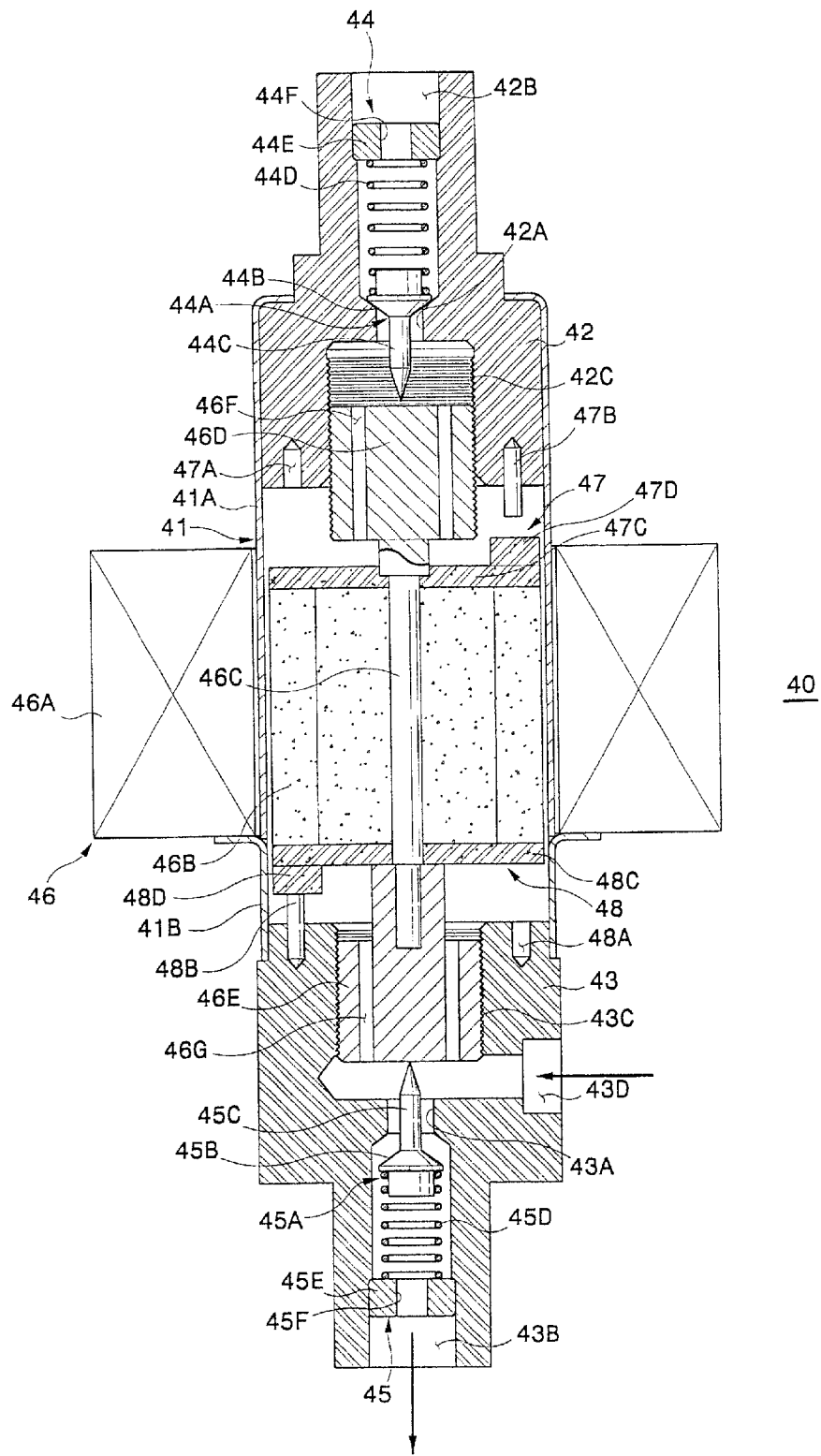

On the other hand, when it is desired to feed refrigerant only to the second evaporator 12 and exclusively cool the second refrigeration compartment R2 to a desired temperature, the three-way flow control valve 40 of this invention is operated as follows. The operation of the valve 40 in such a case will be described with reference to FIGS. 2 and 6.

When it is desired to exclusively cool the second refrigeration compartment R2 to a desired temperature, the stator 46A is electrically activated to rotate the rotor 46B in a reverse direction. In such a case, the first and second actuators 46D and 46E are rotated in the same direction along with the rotor 46B. The first and second actuators 46D and 46E are thus axially moved downward within the bores 42C and 43C in the drawings while being rotated within said bores 42C and 43C. Therefore, the second actuator 46E biases the needle valve body 45A of the second valve means 45 toward the refrigerant outlet 43B while compressing the biasing member 45D, thus opening the orifice 43A of the second valve housing 43. On the other hand, the existing pressure applied from the first actuator 46D to the needle valve body 44A of the first valve means 44 is reduced to allow the valve body 44A to be biased toward the orifice 42A of the first valve housing 42 by the restoring force of the biasing member 44D. Therefore, the orifice 42A is closed by the valve head 44B of the needle valve body 44A.

Such a reverse rotation of the rotor 46B is stopped at a time the stop projection 48D of the second disc 48C is caught by the stop pin 48B. The position of the rotor 46B within the valve 40 in such a case is the lower dead point of the rotor 46B. At the lower dead point of the rotor 46B, the valve head 45B of the needle valve body 45A of the second valve means 45 is completely separated from the second orifice 43A to maximize the opening ratio of said orifice 43A. On the other hand, the valve head 44B of the needle valve body 44A of the first valve means 44 completely closes the first orifice 42A.

In such a case, the refrigerant, introduced from the condenser 30 into the valve 40 through the refrigerant inlet 43D of the second valve housing 43, does not flow through the orifice 42A or the refrigerant outlet 42B of the first valve housing 42. However, all the refrigerant flows from the second valve housing 43 to the second evaporator 12 through the open orifice 43A and the refrigerant outlet 43B of the second valve housing 43. It is thus possible to feed the refrigerant only to the second one 12 of the two parallel evaporators 11 and 12 and exclusively cool the second refrigeration compartment R2 to a desired temperature.

In the three-way flow control valve of this invention, the upper and lower dead points of the rotor 46B may be undesirably changed due to assembling errors of the parts of the valve. In such a case, the changed upper and lower dead points of the rotor 46B are precisely adjusted by seating the stop pins 47B and 48B in appropriate ones of the pin seat holes 47A and 48A, which are formed on the inside end surfaces of the two valve housings 42 and 43 at regular and angular intervals of 30°. Due to such a changeable structure of the two stop pins 47B and 48B, it is possible to precisely adjust the axial moving distance of the rotor 46B as desired.

Figure 7:
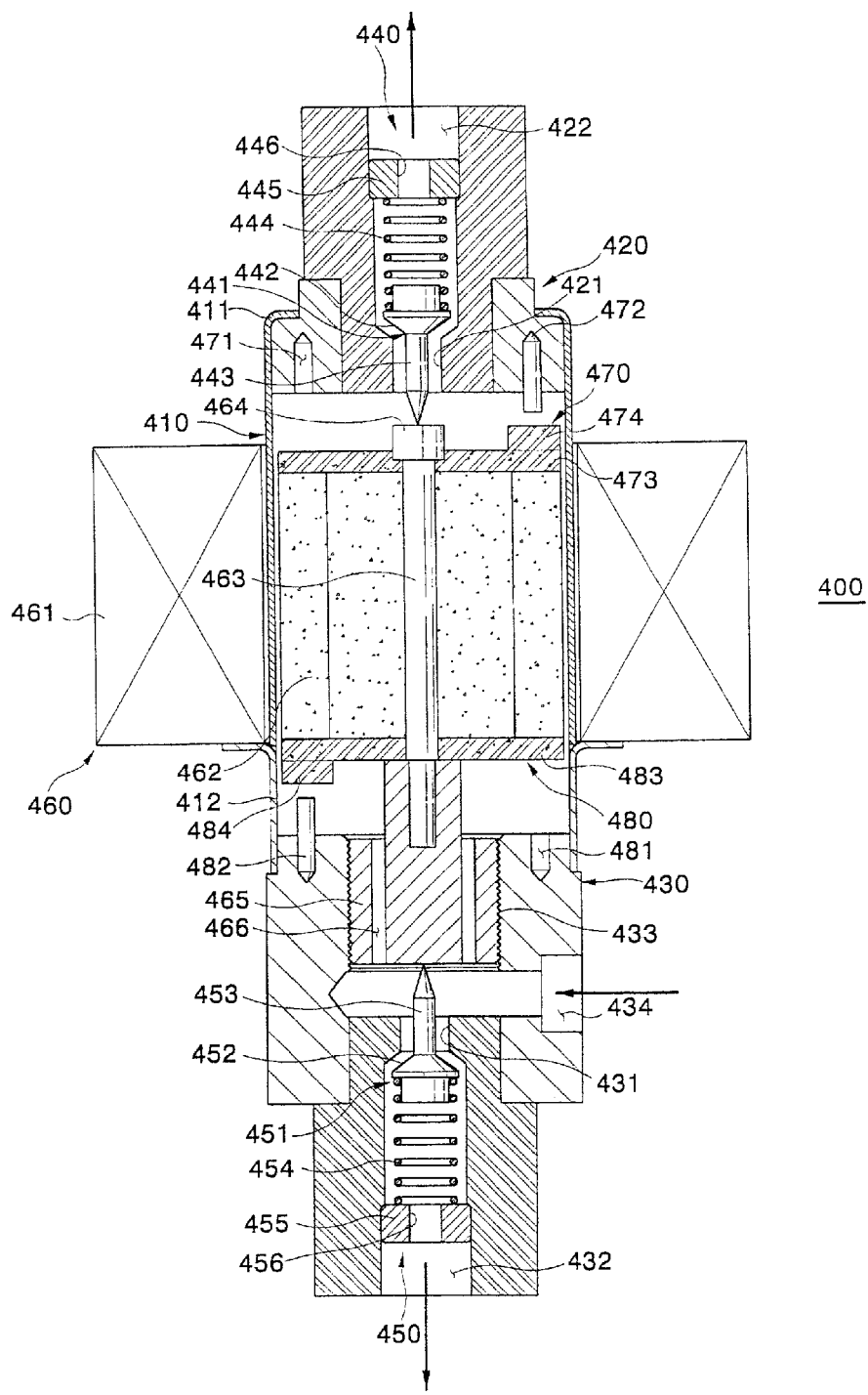
FIG. 7 is a sectional view of a three-way flow control valve in accordance with the second embodiment of the present invention, showing both two outlets of the valve being opened.
Figure 8:
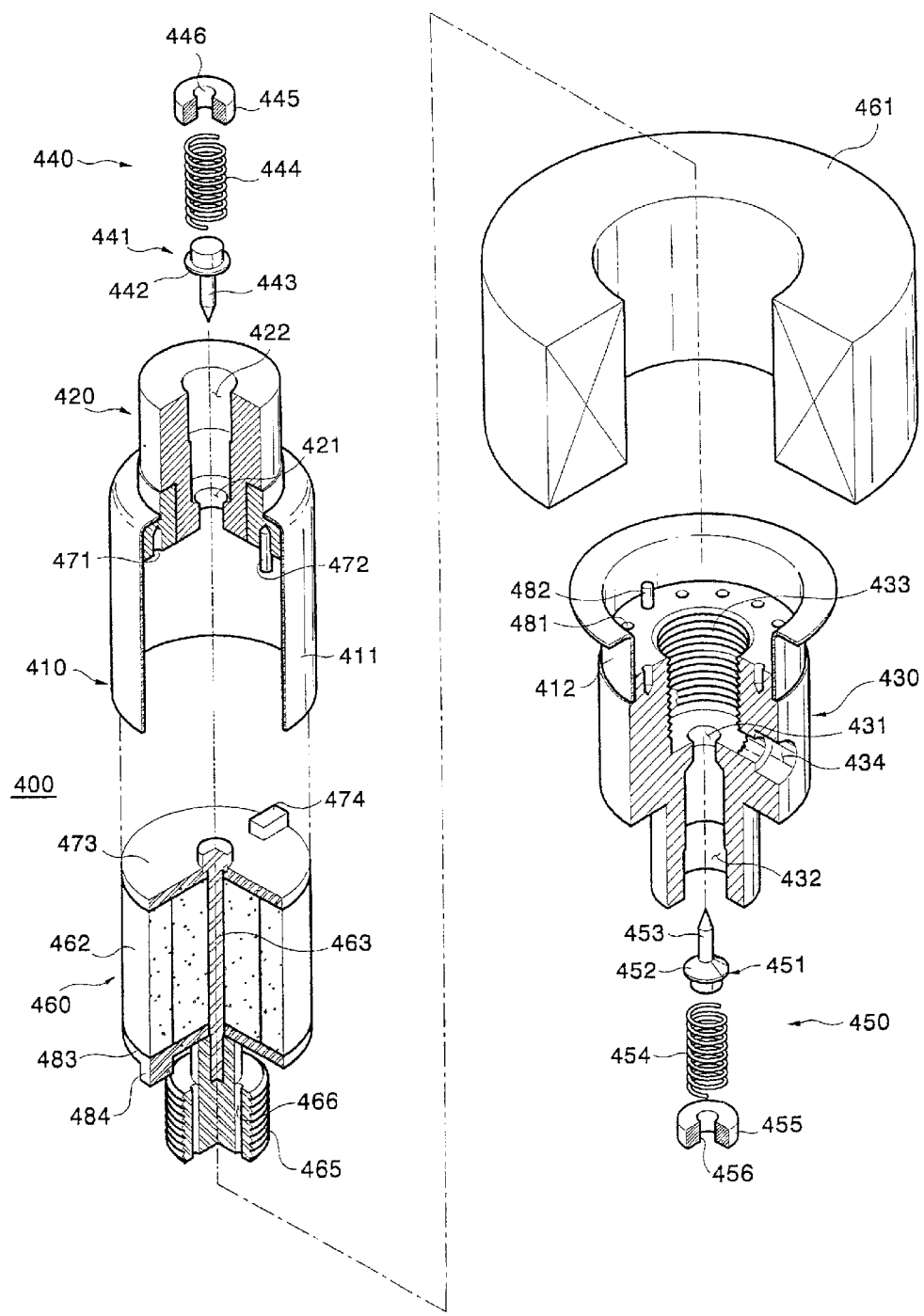
FIG. 8 is an exploded perspective view of the three-way flow control valve of FIG. 7, showing the construction of the important parts of the valve.

FIG. 7 is a sectional view of a three-way flow control valve in accordance with the second embodiment of the present invention. In the second embodiment, the general construction of the three-way flow control valve remains the same as that described for the primary embodiment, but the rotor and the first valve housing are altered.

As shown in FIG. 7, the three-way flow control valve 400 according to the second embodiment of this invention comprises first and second valve housings 420 and 430 having first and second axial orifices 421 and 431. A first valve means 440 and a second valve means 450 are respectively set within the two valve housings 420 and 430 so as to control the opening ratios of the axial orifices 421 and 431 of the two valve housings 420 and 430. An actuation means 460 is set between the two valve housings 420 and 430 so as to actuate the two valve means 440 and 450. Two stoppers 470 and 480 are arranged within the valve 400 at positions around the opposite ends of the actuation means 460.

The first valve housing 420 has a first refrigerant outlet 422, and is held by the upper end of a hollow cylindrical casing 410. The first refrigerant outlet 422 is formed at the outlet end of the first orifice 421, and selectively discharges refrigerant from the first valve housing 420. The inlet end of the first orifice 421 directly communicates with the interior of the casing 410.

The second valve housing 430 has a second refrigerant outlet 432 and a guide bore 433, and is held by the lower end of the cylindrical casing 410. The second refrigerant outlet 432 is formed at the outlet end of the second orifice 431, and selectively discharges refrigerant from the second valve housing 430. The guide bore 433 is formed at the inlet end of the second orifice 431, and is threaded on its internal surface to form internal threads. A refrigerant inlet 434 is formed in the second valve housing 430 at a position between the second refrigerant outlet 432 and the guide bore 433 for introducing refrigerant into the valve 400. That is, the first and second valve housings 420 and 430 are set at opposite ends of the cylindrical casing 410 so as to be opposite each other.

The cylindrical casing 410 comprises upper and lower casing parts 411 and 412. The first valve housing 42 is closely fitted into the upper casing part 411, thus being held by the casing part 411. The lower casing part 412 is flanged outward in a radial direction at its upper edge, thus forming an upper flange. This lower casing part 412 is assembled with the lower end of the upper casing part 411, and is fitted over the second valve housing 430 at its lower end, thus holding the second valve housing 430.

In the three-way flow control valve 400 of this embodiment, the refrigerant outlets 422 and 432 of the two valve housings 420 and 430 are connected to the first and second evaporators 11 and 12, respectively. The refrigerant inlet 434 of the second valve housing 430 is connected to the condenser 30.

The first valve means 440 and the second valve means 450 are movably set within the two valve housings 420 and 430, respectively, such that they control the opening ratios of the axial orifices 421 and 431 of the two valve housings 420 and 430. The first valve means 440 comprises a needle valve body 441, which is axially inserted into the orifice 421 from the refrigerant outlet 422 so as to be movably seated on a valve seat formed around the orifice 421. An elastic biasing member 444 is set within the first valve housing 420 to normally and elastically bias the needle valve body 441 in a direction for closing the orifice 421. A spring holder 445 is firmly set within the refrigerant outlet 422 to support the biasing member 444. This spring holder 445 has a central hole 446 for allowing refrigerant to pass through the holder 445 to reach the refrigerant outlet 422. In the same manner, the second valve means 450 comprises a needle valve body 451, an elastic biasing member 454, and a spring holder 455 having a central hole 456.

In the first valve housing 420, the needle valve body 441 is axially movable within the refrigerant outlet 422 by both the actuation means 460 and the biasing member 444. This needle valve body 441 consists of a conical valve head 442 seated on the valve seat around the orifice 421. A leg 443 extends from the valve head 442 to a predetermined length such that the leg 443 passes through the orifice 421 to reach the interior of the upper casing part 411. In the same manner, the needle valve body 451 within the second valve housing 430 consists of a conical valve head 452, and a leg 453 extending from the valve head 452 to a predetermined length such that the leg 452 passes through the orifice 431 to reach the guide bore 433. This needle valve body 451 is axially movable within the refrigerant outlet 432 by both the actuation means 460 and the biasing member 454.

The actuation means 460 comprises a stator 461, which is externally set around the sidewall of the upper casing part 411 and is supported by the upper flange of the lower casing part 412. The actuation means 460 also comprises a rotor 462, which is set within the casing 410. This rotor 462 is axially movable in opposite directions toward the two valve housings 420 and 430 while being rotated in opposite directions at a position between the two valve housings 420 and 430.

The stator 461 is externally set around the sidewall of the casing 410 at a position between the two valve housings 420 and 430. The rotor 462 has a rotating shaft 463, which axially penetrates the rotor 462 along the central axis of the valve 400. This rotor 462 is rotatable in opposite directions within the cavity between the first and second valve housings 420 and 430 in cooperation with the stator 461 so as to be axially movable in opposite directions toward the two valve housings 420 and 430. An annular gap is formed between the external surface of the rotor 462 and the internal surface of the casing 410, thus allowing the upper and lower parts of the cavity around the rotor 462 to communicate with each other.

First and second actuators 464 and 465 are provided at opposite ends of the rotating shaft 463. The first actuator 464 is assembled with the upper end of the rotating shaft 463, and has a diameter slightly larger than that of the shaft 463. The outside end of the first actuator 464 is always brought into contact with the sharpened end of the leg 443 of the first needle valve body 441, thus selectively biasing the valve body 441 toward the refrigerant outlet 422 as desired. On the other hand, the second actuator 465 is assembled with the lower end of the rotating shaft 463, and is movably set within the guide bore 433 of the second valve housing 430. The outside end of the second actuators 465 is always brought into contact with the sharpened end of the leg 453 of the second needle valve body 451, thus selectively biasing the valve body 451 toward the refrigerant outlet 432 as desired. The second actuator 465 is threaded on its external surface, thus forming external threads movably engaging with the internal threads of the guide bore 433. The second actuator 465 thus moves in opposite directions under the guide of the guide bore 433 in response to a reversible rotation of the rotor 462, and actuates the needle valve body 451. A plurality of communication holes 466 are regularly and axially formed in the second actuator 465 from one end to the other, thus allowing the two valve housings 420 and 430 to communicate with each other through the holes 466.

Each of the two stoppers 470 and 480 comprises a stop pin 472 or 482, which is axially set on the inside end of each valve housing 420 or 430. A rotatable disc 473 or 483 is fixedly set on each end surface of the rotor 462 such that the two discs 473 and 483 are rotatable along with the rotor 462. A stop projection 474 or 484 is formed on the outside surface of each of the two discs 473 and 483 at a predetermined position. Each of the two stop projections 474 and 484 is caught by an associated one of the two stop pins 472 and 482 when the rotor 462 reaches an upper dead point or a lower dead point during an opposite directional axial movement, thus stopping the axial movement of the rotor 462.

In order to seat the stop pins 472 and 482 on the valve housings 420 and 430, a plurality of pin seat holes 471 or 481 are formed on the inside end surface of each valve housing 420 or 430 at regular and angular intervals to form a circular arrangement of holes. Each of the stop pins 472 and 482 is fitted into one of the associated pin seat holes 471 or 481.

The first stop projection 474 extends upward from the disc 473 fixed to the upper end surface of the rotor 462. A predetermined gap is left between the stop projection 474 and the stop pin 472 when the rotor 462 is positioned at a neutral position between the upper and lower dead points to accomplish a neutral mode. In the same manner, the second stop projection 484 extends downward from the disc 483 fixed to the lower end surface of the rotor 462, with a predetermined gap left between the stop projection 484 and the stop pin 482 when the rotor 462 is in neutral mode.

Figure 9:
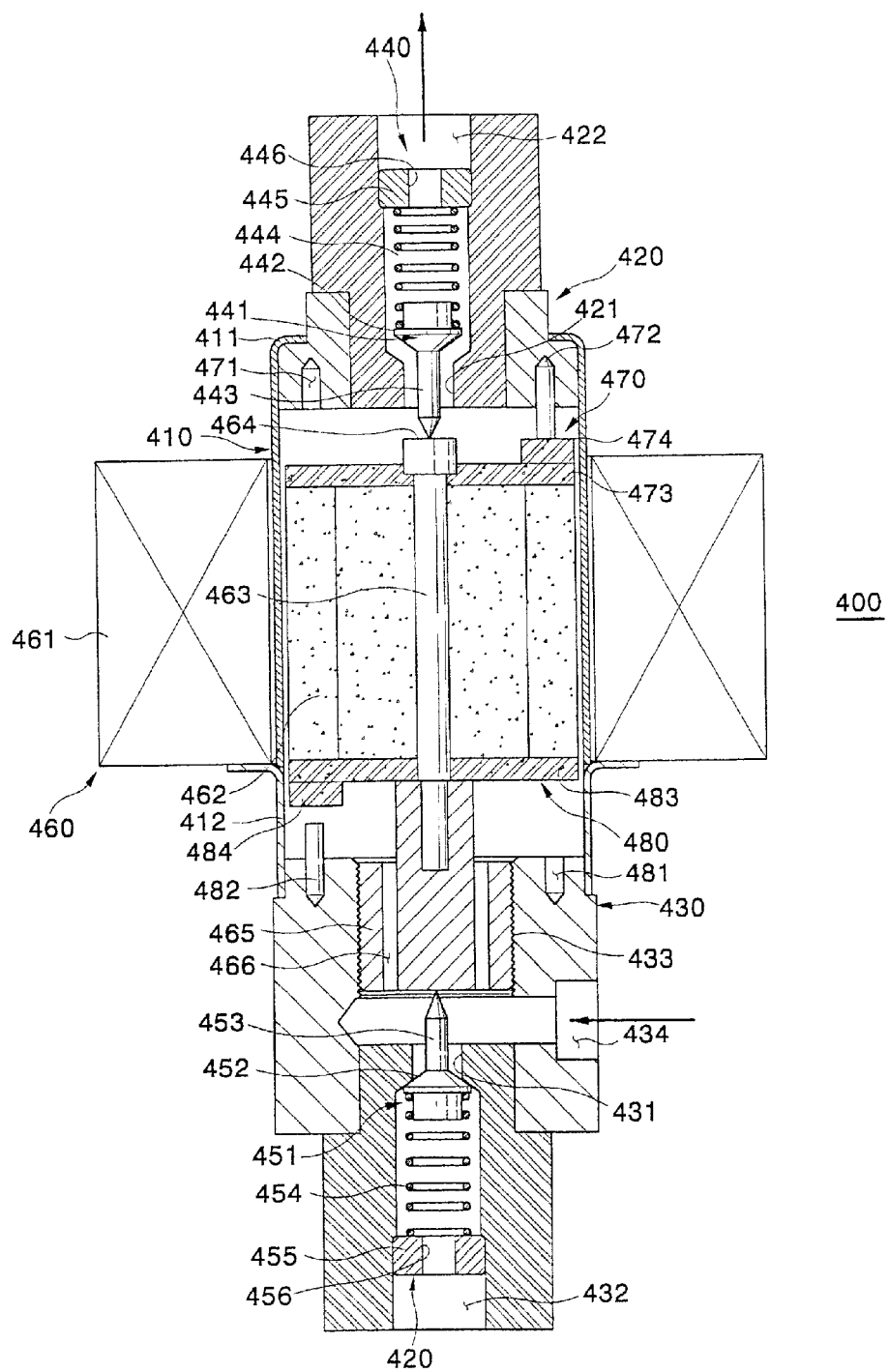
FIGS. 9 and 10 are sectional views of the three-way flow control valve of FIG. 7, showing one of the two outlets being opened and the other being closed.
Figure 10:
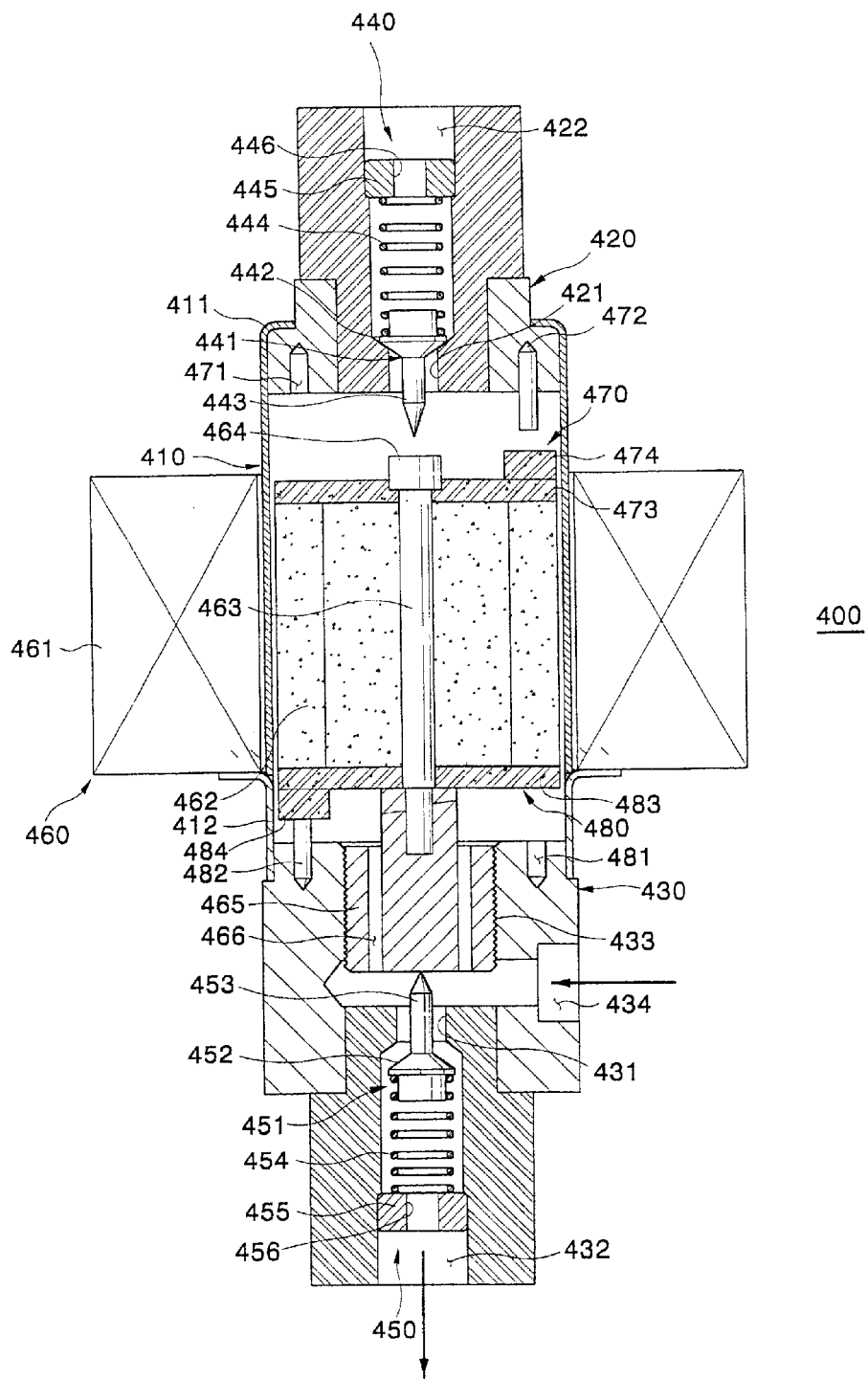

In the three-way flow control valve 400 according to the second embodiment, the first valve housing 420 does not have any guide bore and the first actuator 464 does not have any threads on its external surface, different from the primary embodiment. Therefore, in the valve 400 of this second embodiment, the leg 443 of the valve head 443 of the first needle valve body 441 is exposed to the upper part of the interior of the casing 410, and comes into contact with the first actuator 464 at its sharpened end. The general operation of the three-way flow control valve 400 of this second embodiment thus remains the same as that described for the three-way flow control valve 40 of the primary embodiment, but the first actuator 464 of this second embodiment comes into contact with the first needle valve body 441 to axially move the valve body 441 in opposite directions without being guided by any guide means, different from the primary embodiment. As shown in FIG. 7, which is a view corresponding to FIG. 3, but showing the second embodiment, the orifices 421 and 431 of the first and second valve housings 420 and 430 are open in a neutral mode of the rotor 462, thus allowing refrigerant to be discharged from the valve 400 to the first and second evaporators 11 and 12 through the two refrigerant outlets 422 and 432 at the same time. FIG. 9 is a view corresponding to FIG. 5, but showing the second embodiment. When the rotor 462 is rotated in a forward direction as shown in FIG. 9, the rotor 462 is axially moved upward to open the orifice 421 of the first valve housing 420, thus allowing refrigerant to flow from the valve 400 to the first evaporator 11 through the refrigerant outlet 422 of the first valve housing 420. In such a case, the orifice 431 of the second valve housing 430 is closed, and so refrigerant does not flow from the valve 400 to the second evaporator 12. When the valve 400 accomplishes the position of FIG. 9, it is possible to exclusively cool the first refrigeration compartment R1 to a desired temperature. FIG. 10 is a view corresponding to FIG. 6, but showing the second embodiment. When the rotor 462 is rotated in a reverse direction as shown in FIG. 10, the rotor 462 is axially moved downward to open the orifice 431 of the second valve housing 430, thus allowing refrigerant to flow from the valve 400 to the second evaporator 12 through the refrigerant outlet 432 of the second valve housing 430. In such a case, the orifice 421 of the first valve housing 420 is closed, and so refrigerant does not flow from the valve 400 to the first evaporator 11. It is thus possible to exclusively cool the second refrigeration compartment R2 to a desired temperature.

Further explanation for the operation of the three-way flow control valve 400 according to the second embodiment is not deemed necessary.

As described above, the present invention provides a three-way flow control valve for refrigeration cycles having two parallel evaporators. This flow control valve has two refrigerant outlets, and is designed to selectively open the two outlets at the same time or one of the two outlets. Therefore, the three-way flow control valve of this invention selectively feeds refrigerant to both evaporators, or one of the two evaporators as desired. This three-way flow control valve simplifies the construction of the refrigeration cycles.

In addition, the orifices of the three-way flow control valve of this invention are gradually and smoothly operated by a reversible rotation of the rotor, and so it is possible to preferably reduce operational noise created during the orifice opening or closing operation.

In an operation of the valve of this invention, at least one of the two orifices is always kept open, and so the refrigerant circulation is continued due to a pressure difference even when the compressor stops its refrigerant compressing operation during an operation of the refrigeration cycle. Therefore, a pressure difference is not created between the inlet and outlet of the compressor even when the compressor stops its operation, and so it is possible to overcome any starting problem caused by such a pressure difference in the case of restart of the compressor.

Another advantage of the three-way flow control valve of this invention resides in that the amount of refrigerant for the two parallel and independent evaporators can be effectively controlled. It is thus possible to quickly or slowly cool the refrigeration compartments, having the two evaporators, to desired temperatures.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A three-way flow control valve, comprising:
    a hollow cylindrical casing opened at its first and second ends;
    a first valve housing held in the first end of said casing, and provided with a first refrigerant outlet and a first orifice formed in said first refrigerant outlet;
    a second valve housing held in the second end of said casing, and provided with a refrigerant inlet and a second refrigerant outlet, and a second orifice formed between said refrigerant inlet and said second refrigerant outlet;
    first valve means axially set within said first valve housing so as to be axially movable to control an opening ratio of the first orifice;
    second valve means axially set within said second valve housing so as to be axially movable to control an opening ratio of the second orifice; and
    actuation means for actuating the first valve means and the second valve means, said actuation means being set between the first and second valve housings while allowing the two valve housings to communicate with each other.

2. The three-way flow control valve according to claim 1, wherein:
    first and second guide bores are provided within the first and second valve housings at inlet ends of the first and second orifices, said first and second guide bores being threaded on their internal surfaces to form internal threads and guiding an opposite directional axial movement of the first and second valve means; and
    each of said first and second valve means comprises a spring holder set within an associated refrigerant outlet, a needle valve body movably set within each valve housing while axially penetrating an associated orifice, and an elastic biasing member set between the spring holder and the needle valve body to normally and elastically bias the needle valve body in a direction toward the actuation means.

3. The three-way flow control valve according to claim 2, wherein said actuation means comprises:

a stator externally set around a sidewall of said casing;

a rotor rotatably set within said casing, with a gap left between an external surface of the rotor and an internal surface of the casing;

a rotating shaft axially penetrating said rotor;

a first actuator assembled with an upper end of said rotating shaft and axially moving the needle valve body of the first valve means in opposite directions in cooperation with the elastic biasing member of said first valve means, said first actuator being threaded on its external surface to form external threads movably engaging with the internal threads of the first guide bore; and a second actuator assembled with a lower end of said rotating shaft and axially moving the needle valve body of the second valve means in opposite directions in cooperation with the elastic biasing member of said second valve means, said second actuator being threaded on its external surface to form external threads movably engaging with the internal threads of the second guide bore.

4. The three-way flow control valve according to claim 3, wherein at least one communication hole is axially formed in each of said first and second actuators, thus allowing the first and second valve housings to communicate with each other through the communication holes of the first and second actuators.

5. The three-way flow control valve according to claim 3, wherein two stoppers are provided at positions around opposite end surfaces of said rotor for limiting upper and lower dead points of said rotor.

6. The three-way flow control valve according to claim 5, wherein each of said two stoppers comprises:

a plurality of pin seat holes axially formed on an inside end surface of each of the valve housings;

a stop pin set in one of the pin seat holes of each valve housing;

a rotatable disc set on each end surface of said rotor; and a stop projection formed on an outside surface of the rotatable disc at an edge while extending toward the stop pin so as to be selectively caught by the stop pin.

7. The three-way flow control valve according to claim 1, wherein:

said first orifice of the first valve housing is formed at an inlet end of the first refrigerant outlet, and directly communicates with the interior of said casing;

said first valve means comprises a first spring holder set within the first refrigerant outlet, a first needle valve body movably set within the first valve housing while axially penetrating the first orifice, and a first elastic biasing member set between the first spring holder and the first needle valve body to normally and elastically bias the first needle valve body in a direction toward the actuation means;

a guide bore is provided within the second valve housing at an inlet end of the second orifice, said guide bore being threaded on its internal surface to form internal threads and guiding an opposite directional axial movement of the second valve means; and said second valve means comprises a second spring holder set within the second refrigerant outlet, a second needle valve body movably set within the second valve housing while axially penetrating the second orifice, and a second elastic biasing member set between the second spring holder and the second needle valve body to normally and elastically bias the second needle valve body in a direction toward the actuation means.

8. The three-way flow control valve according to claim 7, wherein said actuation means comprises:

a stator externally set around a sidewall of said casing;

a rotor rotatably set within said casing, with a gap left between an external surface of the rotor and an internal surface of the casing;

a rotating shaft axially penetrating said rotor;

a first actuator assembled with an upper end of said rotating shaft and axially moving the needle valve body of the first valve means in opposite directions in cooperation with the elastic biasing member of said first valve means; and a second actuator assembled with a lower end of said rotating shaft and axially moving the needle valve body of the second valve means in opposite directions in cooperation with the elastic biasing member of said second valve means, said second actuator being threaded on its external surface to form external threads movably engaging with the internal threads of said guide bore of the second valve housing.

9. The three-way flow control valve according to claim 8, wherein at least one communication hole is axially formed in said second actuator, thus allowing the first and second valve housings to communicate with each other through the communication hole of the second actuator.

10. The three-way flow control valve according to claim 8, wherein two stoppers are provided at positions around opposite end surfaces of said rotor for limiting upper and lower dead points of said rotor.

11. The three-way flow control valve according to claim 10, wherein each of said two stoppers comprises:

a plurality of pin seat holes axially formed on an inside end surface of each of the valve housings;

a stop pin set in one of the pin seat holes of each valve housing;

a rotatable disc set on each end surface of said rotor; and a stop projection formed on an outside surface of the rotatable disc at an edge while extending toward the stop pin so as to be selectively caught by the stop pin.

* * * * *